United States Patent [19]

Gutleber

[11] Patent Number: 4,514,853
[45] Date of Patent: Apr. 30, 1985

[54] MULTIPLEXED NOISE CODE GENERATOR UTILIZING TRANSPOSED CODES

[75] Inventor: Frank S. Gutleber, Little Silver, N.J.

[73] Assignee: The United States of America as represented by the Secretary of the Army, Washington, D.C.

[21] Appl. No.: 449,029

[22] Filed: Dec. 13, 1982

[51] Int. Cl.³ ............................................. H03K 13/24
[52] U.S. Cl. ........................................ 375/34; 375/38;
375/60; 370/18; 340/347 DD
[58] Field of Search ........ 340/347 DD, 346, 348–350;
370/18, 19, 21; 375/1, 25, 38, 96, 2.2, 102–104;
364/604, 725, 728, 819, 826

[56] References Cited

U.S. PATENT DOCUMENTS 3,461,451  8/1969  Gutleber .............................. 340/348
4,471,342  9/1984  Gutleber .............................. 375/25

Primary Examiner—Marc E. Bookbinder
Assistant Examiner—Raymond C. Glenny
Attorney, Agent, or Firm—Anthony T. Lane; Jeremiah G. Murray; Paul A. Fattibene

[57] ABSTRACT

Expanded multiplexed noise codes including code mate pairs having autocorrelation functions which upon detection provides an impulse autocorrelation function are generated by delaying the inverse of one of the code mate pairs (code b) by a value $\tau$ and adding it to the other code mate pair (code a) to form a first expanded code mate (code A) while a second expanded code mate (code B) is generated by delaying the inverse of said other code (code a) also by a value $\tau$, forming the complement thereof and adding it to said one code mate (code b). Such an expansion enables each expanded code to begin with each different code of a mate pair.

14 Claims, 4 Drawing Figures

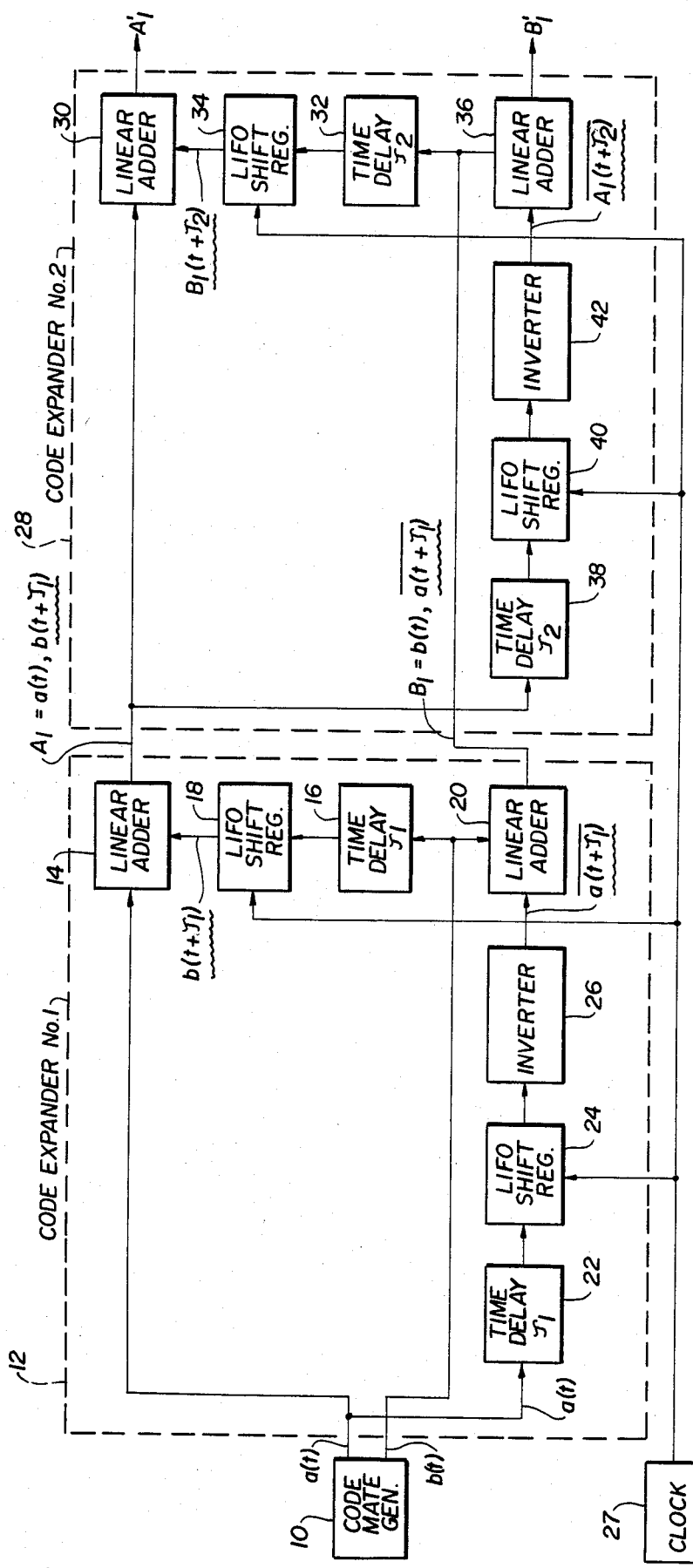
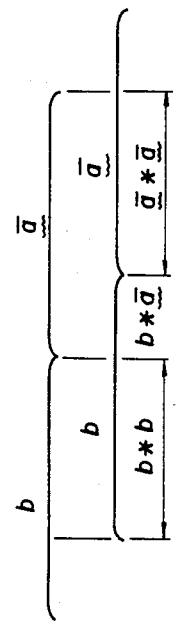
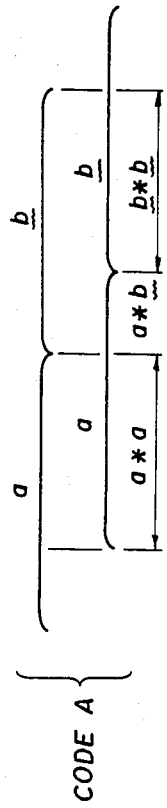

MULTIPLEXED NOISE CODE GENERATOR UTILIZING TRANSPOSED CODES

The invention described herein may be manufactured, used and licensed by or for the Government for governmental purposes without the payment to me of any royalties thereon.

FIELD OF THE INVENTION

This invention relates generally to the generation of multiplexed noise codes and more particularly to the generation of expanded multiplexed noise codes from code mate pairs.

BACKGROUND OF THE INVENTION

The concept of code expansion for the general class of multiplexed noise codes comprised of code mate pairs having autocorrelation functions which upon detection provides an impulse autocorrelation function is generally known. In all of the expansion concepts proposed in the prior art, the approaches involved butting, interleaving, partial interleaving, or overlapping of one code mate (code b) with the other code mate (code a) where one of the codes is delayed by a value $\tau$ in forming each code of a new expanded code pair. A typical example of such techniques is shown and described in U.S. Pat. No. 3,461,451, entitled, "Code Generator To Produce Permutations Of Code Mates", which issued to Frank S. Gutleber, the present inventor, on Aug. 12, 1969. It is to this type of code generation that the present invention pertains.

SUMMARY OF THE INVENTION

Accordingly, it is an object of the present invention to provide an improvement in the generation of multiplexed noise codes.

Another object of the invention is to provide an expansion of multiplexed noise code mate pairs that enables each expanded code to begin with a different code of the original mate pair.

Still a further object of the invention is to provide an improvement in the generation of expanded codes of multiplexed noise code mate pairs.

These and other objects are achieved by a method and apparatus for generating a pair of expanded codes from a basic code mate pair where the first expanded code is generated by delaying the inverse of one code mate by a predetermined time delay and adding it to the other code mate and wherein the second expanded code is generated by delaying the inverse of the other code mate, forming its complement and adding it to said one code mate. With such an expansion process, each expanded code of the expanded code mate pair begins with each different code of the original code mate pair.

BRIEF DESCRIPTION OF THE DRAWINGS

FIG. 1 is a functional block diagram illustrative of apparatus for generating a pair of expanded multiplexed noise codes in accordance with the principles of this invention;

FIGS. 3A and 3B are diagrams helpful in understanding the principles of this invention.

DESCRIPTION OF THE PREFERRED EMBODIMENT

Figure 2:
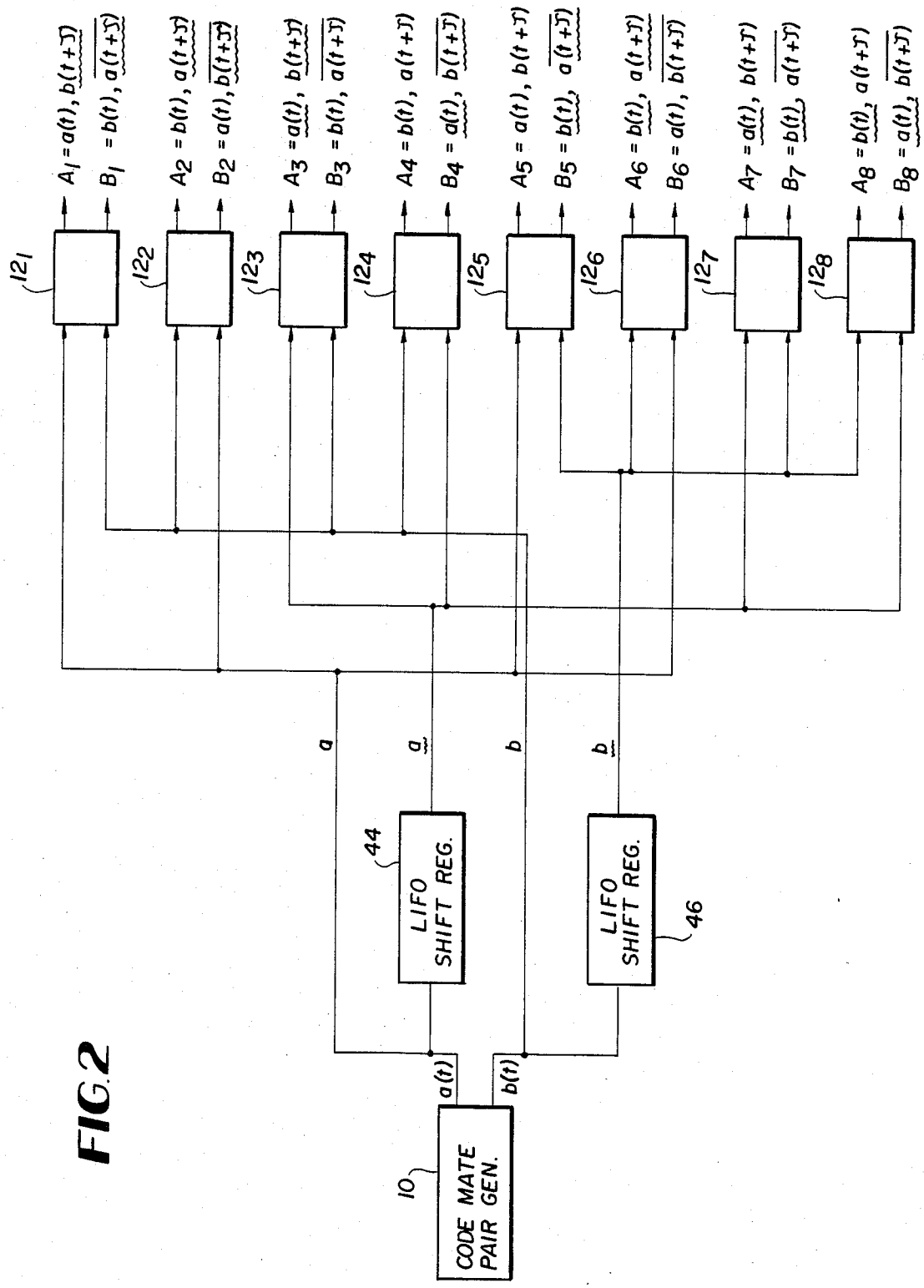
FIG. 2 is a functional block diagram illustrative of apparatus for generating eight different equal length expanded code mate pairs from one code mate pair and their inverse codes in accordance with the principles of this invention.

The present invention is directed to the generation of a type of multi-bit digital codes referred to as noise codes, meaning that the information is coded with a code that is "noise like" in that it will compress to an impulse when detected with a matched filter. In particular, one class of noise codes are known wherein pairs of coded signals termed "code mates" have autocorrelation functions which provide a peak output at a given time and a zero output or outputs having the same magnitude but opposite polarity, at all other times. When code mate signals, for example, are multiplexed, matched filter detected and linearly added, there is provided a lobeless impulse output of a relatively high amplitude at one given time ($\tau=0$) and a zero output at all other times ($\tau \neq 0$). Expressed mathematically, for a pair of code mates a and b, $$\phi_a(\tau) = -\phi_b(\tau) \tag{1}$$

for all $\tau \neq 0$
where
  $\phi_a(\tau)$ is the autocorrelation function of code a, and
  $\phi_b(\tau)$ is the autocorrelation function of code b.
When two codes meet this requirement, then the simple linear sum of their orthogonally multiplexed and detected outputs by means of a matched filter, for example, results in compressing the composite code structure into a single lobeless impulse.

As is well known, code mates a and b can be combined together to provide an expanded code mate pair of twice the code length of a and b. As an example, for a basic code mate pair a and b, an expanded code A can be generated by simply delaying code b by a time $\tau$ and adding it to code a. The mate, code B, to this is then obtained by delaying code b by $\tau$, complementing the delayed code b and adding it to code a. Mathematically, this can be expressed as:

$$A = a(t), b(t + \tau) \tag{2}$$

$$B = a(t), \overline{b(t + \tau)} \tag{3}$$

The delay $\tau$ can have any value and any one of the sub elements making up the expanded code can be complemented to provide an expanded pair. Lastly, codes a and b can be interchanged, when desirable, to further increase the available quantity of different or unique codes that can be generated.

An expanded code mate pair which meets the requirements of equation (1), however, can also be obtained, for example, by delaying the inverse of code b by a value $\tau$ and adding it to code a to form an expanded code A, which is expressed as:

$$A = a(t), b(t+\tau) \tag{4}$$

where x is the inverted digit sequence of a multi-digit code x. The mate B to expanded code A is provided by delaying the inverse of code a, generating its complement and adding it to code b, which is expressed as, $$B = b(t), \overline{a(t + \tau)} \tag{5}$$

where x is the complement of a multi-digit sequence of code x. Accordingly, where x=1011, then x̄=1101 and x̄=0100. The same result obtains where the inverted complements in equations (4) and (5) are reversed, i.e. A=a(t), b̄(t+τ) and B=b(t), ā(t+τ).

Apparatus for implementing the expanded codes A and B in accordance with equations (4) and (5), is disclosed in FIG. 1 and comprises a combination of digital signal time delay devices, inverters, linear adders and last in-first out (LIFO) shift registers, circuit elements well known to those skilled in the art of electronic circuit design.

Referring now to FIG. 1, reference numeral 10 denotes a multi-bit digital signal generator for generating code mates a and b. These codes are outputted in a time related multi-bit sequence as signals a(t) and b(t) which are applied to respective inputs of a code expander unit 12. The code expander 12 is shown comprised of a first linear adder 14 having one input coupled to the signal a(t). The other input to the linear adder comprises a time delayed inverted sequence of the signal b(t) which is first coupled to a time delay device 16 providing a time delay of $\tau_1$ and then to a last in-first out (LIFO) shift register 18 which is adapted to output the signal $\overline{b(t+\tau_1)}$. The linear adder 14 is then operable to add the two multi-bit digital signals and provide an expanded code output of $A_1=a(t), \overline{b(t+\tau_1)}$. Code expander 12 also generates an expanded code mate $B_1$ by directly coupling the signal b(t) to one input of second linear adder 20 which has its other input coupled to a signal $\overline{a(t+\tau_1)}$. The latter signal is provided by another time delay circuit 22, a second LIFO shift register 24, and a digital signal inverter 26. As shown, the output of the linear adder 20 comprises a signal $B_1=b(t), \overline{a(t+\tau_1)}$. Thus, expanded code mate pairs $A_1$ and $B_1$ are generated having a code length twice the length of the original code mates a and b.

FIG. 1 is intended to further illustrate that, when desirable, a second code expansion can be implemented merely by coupling the expanded code mate pairs $A_1$ and $B_1$ to a second code expander unit 28 to generate code mate $A_1'$ and $B_1'$ having a respective code length four times the original code length of codes a and b. As shown, the second code expander is comprised of a linear adder 30 which has the expanded code $A_1$ applied thereto as well as the code $\overline{B_1(t+\tau_2)}$ which is provided by a time delay device 32 providing the time delay of $\tau_2$ and a LIFO shift register 34. The expanded code $B_1'$ is provided by the linear adder 36 which has one input comprising the expanded code $B_1$ as well as the expanded code $A_1$ which is fed through a second $\tau_2$ time delay device 38, a LIFO shift register 40 and an inverter 42.

Further, when desirable, the signal inputs a(t) and b(t) applied to the inputs of the code expander 12 can be reversed without obviating the requirements of equation (1). Accordingly, such a signal reversal will generate expanded code mate pairs $A_2$ and $B_2$ which are expressed mathematically as:

$$A_2 = b(t), \overline{a(t+\tau)} \quad (6)$$

$$B_2 = a(t), \overline{b(t+\tau)} \quad (7)$$

Since a code and its inverse have the same autocorrelation function, the coded signals a(t) and b(t) can initially be inverted and still yield an expanded mate pair which meets the requirements of equation (1). This leads to consideration of FIG. 2 wherein the code mate pair generator 10 in addition to outputting the codes a and b, also have a pair of LIFO shift registers 44 and 46 coupled to the coded signal outputs a(t) and b(t) respectively, which output code ā and b̄ (the inverse of codes a and b). By connecting the code mate pairs a and b and their respective inverse code mate pairs ā and b̄ to eight separate code expander stages $12_1, 12_2 \ldots 12_8$ as shown in FIG. 2 wherein each code expander stage corresponds to the code expander 12 as shown in FIG. 1, eight pairs of expanded code mates meeting the requirements for compressing to a lobeless impulse when detected in a matched filter are provided. All eight pairs of expanded code mates A and B are provided as follows:

$$A_1 = a(t), \overline{b(t+\tau)}$$

$$B_1 = b(t), \overline{a(t+\tau)}$$

$$A_2 = b(t), \overline{a(t+\tau)}$$

$$B_2 = a(t), \overline{b(t+\tau)}$$

$$A_3 = \overline{a(t)}, \overline{b(t+\tau)}$$

$$B_3 = b(t), \overline{a(t+\tau)}$$

$$A_4 = b(t), a(t+\tau)$$

$$B_4 = \overline{a(t)}, \overline{b(t+\tau)}$$

$$A_5 = a(t), b(t+\tau)$$

$$B_5 = \overline{b(t)}, \overline{a(t+\tau)}$$

$$A_6 = \overline{b(t)}, a(t+\tau)$$

$$B_6 = a(t), \overline{b(t+\tau)}$$

$$A_7 = \overline{a(t)}, b(t+\tau)$$

$$B_7 = \overline{b(t)}, \overline{a(t+\tau)}$$

$$A_8 = \overline{b(t)}, a(t+\tau)$$

$$B_8 = \overline{a(t)}, \overline{b(t+\tau)}$$

What is significant about each expanded code mate pair, $A_1, B_1 \ldots A_8, B_8$ is that they each begin with a different code of the original code mate pairs a and b and their inverse. This sequence pattern will also be obtained in any subsequent code expansion provided, for example, by the second code expander 28 of FIG. 1.

The following example is intended to illustrate that when code mate pairs are generated and expanded in accordance with the method set forth above, they exhibit an impulse autocorrelation function when they are separately detected in a matched filter and linearly added together. Where, for example, the code mate pairs a and b are expressed as:

a=1000
b=0010 the autocorrelation function $\phi_a(\tau)$ of code a can be obtained in a well known fashion by detection in a matched filter, not shown, which develops a sequence which can be illustrated as:

$$\phi_a(\tau) = \begin{array}{r} 1\,0\,0\,0 \\ 1\,0\,0\,0 \\ 1\,0\,0\,0 \\ 0\,1\,1\,1 \\ \hline 1 \cdot 0\,0^4\,0 \cdot 1 \end{array} \quad (8)$$

where 0 denotes a pulse of unit amplitude and positive polarity and 1 denotes a pulse of unit amplitude of negative polarity and denotes the absence of a pulse and wherein the exponent signifies the amplitude of the respective pulses.

In the same manner, the autocorrelation function $\phi_b(\tau)$ of code b can be developed in a matched filter, also not shown, in the following fashion:

$$\phi_b(\tau) = \begin{array}{r} 0\,0\,1\,0 \\ 1\,1\,0\,1 \\ 0\,0\,1\,0 \\ 0\,0\,1\,0 \\ \hline 0 \cdot 1\,0^4\,1 \cdot 0 \end{array} \quad (9)$$

From equations (8) and (9) it can be seen that $\phi_a(\tau) = -\phi_b(\tau)$ for all $\tau \neq 0$, and furthermore, when added together, compress to a lobeless impulse $\phi_T(\tau)$ when linearly added together. This is as shown below as:

$$\begin{array}{r} \phi_a(\tau) = 1 \cdot 0\,0^4\,0 \cdot 1 \\ \phi_b(\tau) = 0 \cdot 1\,0^4\,1 \cdot 0 \\ \hline \phi_a(\tau) + \phi_b(\tau) = \phi_T(\tau) = \ldots 0^8 \ldots \end{array} \quad (10)$$

Now expanding the code mate pair a and b in accordance with equations (4) and (5) with $\tau = 4$, an expanded code mate pair A and B is provided, such that, A = a,b̰ = 1 0 0 0 0 1 0 0
B = b,ā = 0 0 1 0 1 1 1 0

If expanded codes A and B meet the requirements for being a mate pair according to equation (1), they will compress to a lobeless impulse when separately detected in a matched filter and linearly added. That this is true can be demonstrated by the following illustration. Compressing code A in a matched filter, not shown, provides an output $\phi_A(\tau)$ which is developed as follows:

$$\phi_A(\tau) = \begin{array}{r} 1\,0\,0\,0\,0\,1\,0\,0 \\ 1\,0\,0\,0\,0\,1\,0\,0 \\ 0\,1\,1\,1\,1\,0\,1\,1 \\ 1\,0\,0\,0\,0\,1\,0\,0 \\ 1\,0\,0\,0\,0\,1\,0\,0 \\ 1\,0\,0\,0\,0\,1\,0\,0 \\ 1\,0\,0\,0\,0\,1\,0\,0 \\ 0\,1\,1\,1\,1\,0\,1\,1 \\ \hline 1 \cdot 0^3 \cdot 0 \cdot 0\,0^8\,0 \cdot 0 \cdot 0^3 \cdot 1 \end{array} \quad (11)$$

In a like manner, compressing code B in a matched filter, not shown, provides an output $\phi_B(\tau)$ which is developed as:

$$\phi_B(\tau) = \begin{array}{r} 0\,0\,1\,\,\,0\,1\,1\,1\,0 \\ 1\,1\,0\,1\,0\,0\,0\,\,\,1 \\ 1\,\,\,1\,0\,1\,0\,0\,\,\,0\,1 \\ 1\,1\,0\,1\,0\,\,\,0\,0\,1 \\ 0\,0\,1\,0\,\,\,1\,1\,1\,0 \\ 1\,1\,0\,\,\,1\,0\,0\,0\,1 \\ 0\,0\,\,\,1\,0\,1\,1\,1\,0 \\ \,\,\,0\,0\,1\,0\,1\,1\,1\,0 \\ \hline 0 \cdot 1^3 \cdot 1 \cdot 1\,0^8\,1 \cdot 1 \cdot 1^3 \cdot 0 \end{array} \quad (12)$$

The addition of $\phi_A(\tau)$ and $\phi_B(\tau)$ provides a composite signal $\phi_T(\tau)$ which provides a lobeless signal as illustrated below:

$$\begin{array}{r} \phi_A(\tau) = 1 \cdot 0^3 \cdot 0 \cdot 0\,0^8\,0 \cdot 0 \cdot 0^3 \cdot 1 \\ \phi_B(\tau) = 0 \cdot 1^3 \cdot 1 \cdot 1\,0^8\,1 \cdot 1 \cdot 1^3 \cdot 0 \\ \hline \phi_A(\tau) + \phi_B(\tau) = \phi_T(\tau) = \ldots\ldots 0^{16} \ldots\ldots \end{array} \quad (13)$$

As a second example, consider a mate pair where,
a = 1 0 0
b = 0.0
Expanding the mate pairs a and b into A = a(t), b(t+τ) and B = b(t), a(t+τ) for τ = 3 results in,
A = 1 0 0 0.0
B = 0.0 1 1 0

Pulse compressing code A in a matched filter provides an output $\phi_A(\tau)$ which is illustrated below as:

$$\phi_A(\tau) = \begin{array}{r} 1\,0\,0\,0 \cdot 0 \\ 1\,0\,0\,0\,\cdot 0 \\ 1\,0\,0\,\cdot 0\,0 \\ 1\,0\,\cdot 0\,0\,0 \\ 0\,1\,1\,1\,\cdot 1 \\ \hline 1\,0 \cdot 0\,0\,0^5\,0\,0 \cdot 0\,1 \end{array} \quad (14)$$

In a like manner, pulse compressing code B in a matched filter provides an output $\phi_B(\tau)$ which is developed below as:

$$\phi_B(\tau) = \begin{array}{r} 0 \cdot 0\,1\,1\,0 \\ 1 \cdot 1\,0\,0\,1 \\ 1 \cdot 1\,0\,0\,1 \\ 0 \cdot 0\,1\,1\,0 \\ 0\,\cdot 0\,1\,1\,0 \\ \hline 0\,1 \cdot 1\,1\,0^5\,1\,1 \cdot 1\,0 \end{array} \quad (15)$$

Adding $\phi_A(\tau)$ and $\phi_B(\tau)$ results in a lobeless impulse signal of $\tau_T(\tau)$ being developed as:

$$\begin{array}{r} \phi_A(\tau) = 1\,0 \cdot 0\,0\,0^5\,0\,0 \cdot 0\,1 \\ \phi_B(\tau) = 0\,1 \cdot 1\,1\,0^5\,1\,1 \cdot 1\,0 \\ \hline \phi_T(\tau) = \ldots\ldots 0^{10} \ldots\ldots \end{array} \quad (16)$$

Reference now to FIGS. 3A and 3B will provide a better understanding of the mathematical operations associated with obtaining the composite autocorrelation function for the expanded codes A and B which is obtained by pulse compressing the individual codes in their respective matched filters. An inspection of FIG. 3A indicates that the autocorrelation function of code A is given by, $$\phi_A(\tau) = a*a + a*\underline{b} + \underline{b}*\underline{b} \quad (17)$$

where x * x is the autocorrelation function of code x and x * y is the crosscorrelation function between codes x and y.

Since a and b comprise a code mate pair, $$a*a + b*b = 0 \tag{18}$$

and therefore, $$\phi_A(\tau) = a*b \tag{19}$$

In a like manner, and with reference to FIG. 3B, the diagram indicates that $\phi_B(\tau)$ is given by the equation, $$\phi_B(\tau) = b*b + b*\bar{a} + \bar{a}*\bar{a} \tag{20}$$

Since a and b comprise a code mate pair, $$b*b + \bar{a}*\bar{a} = 0 \tag{21}$$

for all $\tau \neq 0$,

Therefore, $\phi_B(\tau) = b*\bar{a}$ \hfill (22)

Accordingly, the composite autocorrelation function $\phi_T(\tau)$ for expanded codes A and B, is:

$$\phi_T(\tau) = \phi_A(\tau) + \phi_B(\tau) = a*b + b*\bar{a} \tag{23}$$

Since $a*b = b*a$ $$\phi_T(\tau) = b*a + b*\bar{a} \tag{24}$$

Also, since $b*\bar{a} = -b*a$, $$\phi_T(\tau) = b*a - b*a = 0 \tag{25}$$

Or $$\phi_T(\tau) = 0$$

for all $\tau \neq 0$ \hfill (26)

And at $\tau = 0$, $\phi_T(\tau) = 4n$
where n is the number of code bits in the code mates a and b.

Having thus shown and described what is at present considered to be the preferred method and means for implementing the subject invention, it should be noted that the same has been made by way of illustration and not limitation. Accordingly, all modifications, alterations and substitutions may be made without departing from the spirit and scope of the invention as set forth in the appended claims.

I claim:

1. A method of generating a pair of expanded multi-bit digital noise coded signals from a pair of multi-bit digital noise coded signals comprising the steps of:
    generating simultaneously first and second multi-bit digital noise coded signals;
    generating the inverse of said second signal;
    delaying the inverse of said second signal by a predetermined time delay and combining it with said first signal to form a first expanded multi-bit digital noise coded signal beginning with said first signal;
    generating the inverse of said first signal;
    generating the complement of the inverse of said first signal; and
    delaying the inverse complement of said first signal and combining it with said second signal to form a second expanded multi-bit digital noise coded signal beginning with said second signal.

2. The method as defined by claim 1 wherein:
    said first-mentioned combining step comprises the step of adding the delayed inverse of said second signal to said first signal; and
    said second-mentioned combining step comprises the step of adding the delayed inverse complement of said first signal to said second signal.

3. The method as defined in claim 2 wherein:
    said first-mentioned adding step comprises the step of butting the delayed inverse of said second signal to said first signal; and
    said second-mentioned adding step comprises the step of butting the delayed inverse complement of said first signal to said second signal.

4. The method as defined by claim 3 wherein said first and second signals have equal signal lengths, and wherein said predetermined time delay is equal to said signal length.

5. The method as defined by claim 1 wherein:
    said first-mentioned combining steps comprises the step of selectively butting, interleaving, partial interleaving or overlapping the delayed inverse of said second signal with said first signal; and
    said second-mentioned combining step comprises the step of selectively butting, interleaving, partial interleaving or overlapping the delayed inverse complement of said first signal with said second signal to respectively form said first and second expanded multi-bit digital noise coded signals.

6. The method as defined by claim 5 wherein said first and second signals comprise multiplexed noise coded signals comprising a code mate pair which upon autocorrelation detection and addition compress to a lobeless impulse.

7. A system for generating a pair of expanded multi-bit digital noise coded signals from another pair of multi-bit digital noise coded signals comprising:
    means for simultaneously generating first and second multi-bit digital noise coded signals;
    means coupled to said generating means for providing the inverse of said second signal delayed by a predetermined time delay;
    means for combining the delayed inverse of said second signal with said first signal to form a first expanded multi-bit digital noise coded signal beginning with said first signal;
    means coupled to said generating means for providing an inverse complement of said first signal also delayed by a predetermined time delay; and
    means for combining the delayed inverse complement of said first signal with said second signal to form a second expanded multi-bit digital noise coded signal beginning with said second signal.

8. The system as defined by claim 7 wherein said means for providing the delayed inverse of said second signal comprises, time delay means for delaying said second signal by a time delay equal to the signal length of said first signal and means for reversing the sequence of the respective bits of said second signal, and
    wherein said means for providing a delayed inverse complement of said first signal comprises, time delay means for delaying said first signal by a time delay equal to the signal length of said second signal, means for reversing the sequence of the respective bits of said first signal, and means for reversing the respective digital value of each bit of said first signal.

9. The system as defined by claim 8 wherein said means for reversing the sequence of the bits of said first and second signals comprises shift register means which is operable to output the respective signal sequence in a last in-first out sequence.

10. The system as defined by claim 8 wherein said means for reversing the digital value of each bit of said first signal comprises digital signal inverter means.

11. The system as defined by claim 7 wherein said means for combining the delayed inverse of said second signal with said first signal comprises first digital signal adder means; and wherein said means for combining the delayed inverse complements of said first signal with said second signal comprises second digital signal adder means.

12. The system as defined by claim 11 wherein said first and second digital signal adder means are comprised of linear adders.

13. The system as defined by claim 7 wherein said means for combining said first and second signals comprise means for selectively butting, interleaving, partially interleaving or overlapping the delayed inverse of said second signal with said first signal and the delayed inverse complement of said first signal with said second signal to respectively form said first and second expanded multi-bit digital noise coded signals.

14. The system as defined by claim 13 wherein said first and second signals comprise a pair of code mates which provide an impulse autocorrelation function and compress to a lobeless impulse when added.

* * * * *